(12) United States Patent
Hamann et al.

(10) Patent No.: US 10,110,838 B2
(45) Date of Patent: Oct. 23, 2018

(54) MULTIFUNCTIONAL SKY CAMERA SYSTEM FOR TOTAL SKY IMAGING AND SPECTRAL RADIANCE MEASUREMENT

(71) Applicant: International Business Machines Corporation, Armonk, NY (US)

(72) Inventors: Hendrik F. Hamann, Yorktown Heights, NY (US); Siyuan Lu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/700,777

(22) Filed: Sep. 11, 2017

(65) Prior Publication Data

US 2018/0013968 A1  Jan. 11, 2018

Related U.S. Application Data

(63) Continuation of application No. 14/031,709, filed on Sep. 19, 2013, now Pat. No. 9,781,363, which is a
(Continued)

(51) Int. Cl.
*H04N 7/18* (2006.01)
*H04N 5/359* (2011.01)
(Continued)

(52) U.S. Cl.
CPC ............ *H04N 5/3591* (2013.01); *G01W 1/12* (2013.01); *G06T 5/008* (2013.01); *G06T 7/20* (2013.01);
(Continued)

(58) Field of Classification Search
None
See application file for complete search history.

(56) References Cited

U.S. PATENT DOCUMENTS 3,934,259 A  1/1976 Krider
4,577,115 A  3/1986 Rentsch et al.
(Continued)

OTHER PUBLICATIONS

C. Falldorf et al., "Liquid Crystal Spatial Light Modulators in Optical Metrology," 2010 9th Euro-American Workshop on Information Optics (WIO), pp. 1-3, Jul. 2010.
(Continued)

*Primary Examiner* — James M Anderson, II
(74) *Attorney, Agent, or Firm* — Vazken Alexanian; Michael J. Chang, LLC (57) ABSTRACT

A multifunctional sky camera system and techniques for the use thereof for total sky imaging and spectral irradiance/radiance measurement are provided. In one aspect, a sky camera system is provided. The sky camera system includes an objective lens having a field of view of greater than about 170 degrees; a spatial light modulator at an image plane of the objective lens, wherein the spatial light modulator is configured to attenuate light from objects in images captured by the objective lens; a semiconductor image sensor; and one or more relay lens configured to project the images from the spatial light modulator to the semiconductor image sensor. Techniques for use of the one or more of the sky camera systems for optical flow based cloud tracking and three-dimensional cloud analysis are also provided.

19 Claims, 7 Drawing Sheets

Related U.S. Application Data continuation of application No. 13/873,653, filed on Apr. 30, 2013, now Pat. No. 9,565,377.

(51) Int. Cl.

| | | |
|---|---|---|
| *H04N 5/232* | (2006.01) | |
| *H04N 13/239* | (2018.01) | |
| *G06T 7/20* | (2017.01) | |
| *H04N 5/238* | (2006.01) | |
| *H04N 5/225* | (2006.01) | |
| *G01W 1/12* | (2006.01) | |
| *G06T 5/00* | (2006.01) | |
| *G06T 7/80* | (2017.01) | |
| *G06T 7/593* | (2017.01) | |
| *G06T 7/215* | (2017.01) | |

(52) U.S. Cl.
CPC .............. *G06T 7/215* (2017.01); *G06T 7/593* (2017.01); *G06T 7/85* (2017.01); *H04N 5/2254* (2013.01); *H04N 5/238* (2013.01); *H04N 5/23238* (2013.01); *H04N 5/23296* (2013.01); *H04N 13/239* (2018.05); *G06T 2207/10021* (2013.01)

(56) References Cited

U.S. PATENT DOCUMENTS

| | | | |
|---|---|---|---|
| 5,917,568 A | 6/1999 | Johnson et al. | |
| 5,946,128 A | 8/1999 | Paek | |
| 6,489,992 B2 | 12/2002 | Savoye | |
| 7,139,025 B1 | 11/2006 | Berezin | |
| 7,684,105 B2 | 3/2010 | Lamontagne et al. | |
| 8,164,669 B2 | 4/2012 | Compton et al. | |
| 8,659,686 B1* | 2/2014 | Clark .................. | G06K 9/3241 348/169 |
| 2004/0169770 A1 | 9/2004 | Widener et al. | |
| 2005/0099513 A1* | 5/2005 | Ishibashi ............. | H04N 5/2353 348/234 |
| 2005/0286770 A1* | 12/2005 | Hirata ................. | G06K 9/0063 382/191 |
| 2010/0149551 A1* | 6/2010 | Malinkevich ......... | G01B 11/25 356/603 |
| 2010/0250177 A1 | 9/2010 | Van Acht et al. | |
| 2011/0157419 A1 | 6/2011 | Nayar et al. | |
| 2012/0021385 A1* | 1/2012 | Belenkii ................ | G09B 27/00 434/19 |
| 2012/0075109 A1 | 3/2012 | Wang et al. | |
| 2012/0127334 A1 | 5/2012 | Imai | |
| 2012/0155704 A1* | 6/2012 | Williams ................ | G01W 1/00 382/103 |
| 2013/0020662 A1 | 1/2013 | Kao et al. | |
| 2013/0126706 A1 | 5/2013 | Lynass et al. | |

OTHER PUBLICATIONS

J. Piprek et al., "Analysis of Multi-Quantum Well Electroabsorption Modulators," SPIE Proceedings 4646-77, Physics and Simulation of Optoelectronic Devices X, Photonics West Jan. 2002 (9 total pages).

P.D. Hiscocks, "Integrating Sphere for Luminance Calibration," published Mar. 2012, pp. 1-12.

B.D Lucas and T. Kanade, "An Iterative Image Registration Technique with an Application to Stereo Vision," Proceedings of Imaging Understanding Workshop, pp. 121-130 (Apr. 1981).

B.K.P Horn et al., "Determining Optical Flow," Artificial Intelligence, 17, 185-203 (Aug. 1981).

J.L. Barron et al., "Performance of Optical Flow Techniques," International Journal of Computer Vision, vol. 12, pp. 43-77 (Feb. 1994).

Reda, I., Andreas, A., (2003) Solar Position Algorithm for Solar Radiation Applications, National Renewable Energy Laboratory (NREL) Technical report NREL/TP-560-34302, Revised Jan. 2008 (56 total pages).

U. Feister et al., "Ground-Based Cloud Images and Sky Radiances in the Visible and Near Infrared Region from Whole Sky Imager Measurements," EUMP31, EUMETSAT Satellite Application Facility Workshop, Dresden, Germany, 2000 (10 total pages).

T.E. Pickering, "The MMT all-sky camera," Proc. SPIE 6267, Ground-based and Airborne Telescopes, 62671A, (Jun. 2006) (7 total pages).

A. Donval et al., "Increasing dynamic range of cameras with dynamic sunlight filter (DSF)," Proc. SPIE 8012, 80122A, May 2011 (8 total pages).

K. Tohsing et al., "Measuring high-resolution sky luminance distributions with a CCD camera," Applied Optics, vol. 52, No. 8, Mar. 2013, pp. 1564-1573.

\* cited by examiner

MULTIFUNCTIONAL SKY CAMERA SYSTEM FOR TOTAL SKY IMAGING AND SPECTRAL RADIANCE MEASUREMENT

CROSS-REFERENCE TO RELATED APPLICATION(S)

This application is a continuation of U.S. application Ser. No. 14/031,709 filed on Sep. 19, 2013, now U.S. Pat. No. 9,781,363, which is a continuation of U.S. application Ser. No. 13/873,653 filed on Apr. 30, 2013, now U.S. Pat. No. 9,565,377, the disclosures of each of which are incorporated by reference herein.

FIELD OF THE INVENTION

The present invention relates to total sky imaging techniques and more particularly, to a multifunctional sky camera system and techniques for the use thereof for total sky imaging as well as spectrally-resolved irradiance/radiance measurement.

BACKGROUND OF THE INVENTION

Total sky imaging systems are powerful tools for various scientific and industrial applications such as high resolution cloud tracking and short-term (less than one hour) solar power forecasting. The contrast required by sky imaging (~1:1,000,000), however, far exceeds the capability of currently available digital imaging sensors (typically 1:1,000 or less dynamic range). A cloudy twilight sky (no direct sun) has a radiance of ~0.1 milliwatts per square centimeter steradian ($mW/cm^2sr$) while direct sun illumination from a clear sky at noon has radiance $\sim 1 \times 10^5$ $mW/cm^2sr$. Imaging twilight sky demands a camera system without significant light attenuation.

On the other hand, the high intensity direct sun light without significant attenuation impinging on imaging sensors causes pixel saturation and blooming, i.e., accumulation of photoelectrons exceeds the designed linear-response and charge-holding capabilities of sensor pixels (saturation), which causes the excessive electrons to overflow to its neighboring pixels (blooming). Blooming causes artifacts in sensor output which include large image area around sun being smeared out, streak patterns on image, and erroneous pixel values. In extreme cases, even complete failure of a sensor can result from blooming due to breakdown of the preamplication stage.

To avoid sensor saturation and blooming, the commercial sky cameras available today typically use automated sun-tracking mechanical blockers to prevent direct sun light from entering the camera. The usage of mechanical sun blockers increases the cost of sky cameras and decreases their reliability in harsh field environments. Moreover, information on the sun and the part of the sky adjacent to the sun (typically around a 10 degree field of view), which is most important for solar power forecast, is lost because of the blocking. Moreover, because the sun is blocked, such sky camera systems can only image the sky around the sun and cannot measure the solar radiation. Thus several additional radiometric instruments such as pyronameters, spectroradiometers, and pyrheliometers (require precise sun tracking mechanism) are typically deployed along with sky cameras to measure the direct and diffusive irradiance from the sun. This significantly increases the overall system complexity and cost.

Therefore, improved total sky imaging systems that overcome the above-described drawbacks of conventional technologies would be desirable.

SUMMARY OF THE INVENTION

The present invention provides a multifunctional sky camera system and techniques for the use thereof for total sky imaging and spectrally resolved irradiance/radiance measurement. In one aspect of the invention, a sky camera system is provided. The sky camera system includes an objective lens having a field of view of greater than about 170 degrees; a spatial light modulator at an image plane of the objective lens, wherein the spatial light modulator is configured to attenuate light from objects in images captured by the objective lens; a semiconductor image sensor, and one or more relay lens configured to project the images from the spatial light modulator to the semiconductor image sensor.

In another aspect of the invention, a total sky imaging system is provided. The total sky imaging system includes at least one first sky camera system and at least one second sky camera system, wherein the first sky camera system and the second sky camera system each includes (i) an objective lens having a field of view of greater than about 170 degrees, (ii) a spatial light modulator at an image plane of the objective lens, wherein the spatial light modulator is configured to attenuate light from objects in images captured by the objective lens, (iii) a semiconductor image sensor, and (iv) one or more relay lens configured to project the images from the spatial light modulator to the semiconductor image sensor, and wherein the first sky camera system and the second sky camera system are located at a distance of from about 100 meters to about 1,000 meters from one another.

In yet another aspect of the invention, a method for cloud tracking is provided. The method includes the steps of: (a) obtaining a time-lapsed series of sky images using a sky camera system including (i) an objective lens having a field of view of greater than about 170 degrees, (ii) a spatial light modulator at an image plane of the objective lens, wherein the spatial light modulator is configured to attenuate light from objects in images captured by the objective lens, (iii) a semiconductor image sensor, and (iv) one or more relay lens configured to project the images from the spatial light modulator to the semiconductor image sensor, and (b) computing a velocity of one or more pixels in the time-lapsed series of sky images using optical flow analysis, wherein pixels in the time-lapsed series of sky images corresponding to cloud regions have a finite velocity and pixels in the time-lapsed series of sky images corresponding to non-cloud regions have a zero velocity.

In still yet another aspect of the invention, a method for three-dimensional cloud tracking is provided. The method includes the steps of: (a) obtaining sky images from each of at least one first sky camera system and at least one second sky camera system, wherein the first sky camera system and the second sky camera system each includes (i) an objective lens having a field of view of greater than about 170 degrees, (ii) a spatial light modulator at an image plane of the objective lens, wherein the spatial light modulator is configured to attenuate light from objects in an image captured by the objective lens, (iii) a semiconductor image sensor, and (iv) one or more relay lens configured to project the image from the spatial light modulator to the semiconductor image sensor, and wherein the first sky camera system and the second sky camera system are located at a distance of from about 100 meters to about 1,000 meters from one another, (b) measuring a position of clouds in the images based on x,y,z axes coordinates of each of the first sky camera system and the second sky camera system; (c) determining an x',y',z' orientation of each of the first sky camera system and the second sky camera system with respect to zenith and north as references; (d) determining an orientation of the clouds with respect to the zenith and north using the position of the clouds in the images measured in step (b) and the orientation of each of the first sky camera system and the second sky camera system with respect to the zenith and north determined in step (c); and (e) calculating a position and a vertical height of the clouds in the sky using triangulation based on the orientation of the clouds with respect to the zenith and north from step (d) and three-dimensional coordinates of the first sky camera system and the second sky camera system.

A more complete understanding of the present invention, as well as further features and advantages of the present invention, will be obtained by reference to the following detailed description and drawings.

DETAILED DESCRIPTION OF PREFERRED EMBODIMENTS

Provided herein is a sky camera-based multifunctional system that may be used for sky imaging, radiation measurement, and two- and three-dimensional cloud analysis. Both the design of the sky camera system and analysis methods based on images acquired using such a sky camera system are described in detail below.

The present sky camera system combines an image sensor with spatial light modulator to achieve the necessary $\sim 10^6$ dynamic range to cover dim twilight and direct sun and thus circumvents the need for mechanical sun blocking as in conventional systems (see above). As will be described in detail below, the present camera system is multifunctional as it can be used not only for imaging but also for gathering complete spatially and spectrally resolved sky radiation information in the ultraviolet (UV), visible (Vis), near-infrared (NIR) regime most relevant to solar power forecasting applications. Further, with the appropriate semiconductor image sensors (see below), the wavelength of radiation measurement can be extended into the mid-infrared (MIR) and long-wavelength-infrared (LWIR) regimes.

A single such camera system may carry out the functionality and replace the combination of conventional total sky imager and radiometric instruments thus providing significantly cost-savings and reliability enhancement over known technologies. Moreover, because the present camera system can include sun in the scene, it offers advantages for cloud tracking over conventional sky cameras. First, the immediate region near the sun (around 10 degree field of view typically blocked when using conventional sky cameras with mechanical blockers) becomes available for cloud recognition such as using an optical flow based analysis as described below. It is notable that the cloud adjacent to the sun is the most relevant for the purpose of very short range (less than 15 minutes) forecasting of solar radiation through the clouds.

Second, the position of the sun offers a built-in reference for the orientation of the sky camera. Note that for sky camera systems mounted on moving/mobile carriers such as a research vessel or aircraft whose orientation is constantly changing, the sun position provides a means for correcting the measurement of the orientation of the system camera system. The accurate measurement of the camera orientation is important not only for time-lapsed cloud imaging and prediction of cloud motion but also when multiple cameras are to be used for three-dimensional cloud tracking in which the base height of the cloud can be obtained by triangulation. In the following, a detailed description will be provided of (1) the design of the sky camera system, (2) optical flow based method for cloud recognition and cloud motion prediction, and (3) methods of triangulation of cloud height including using the sun as the reference to improve measurement accuracy of the orientation of the sky camera system.

Figure 1:
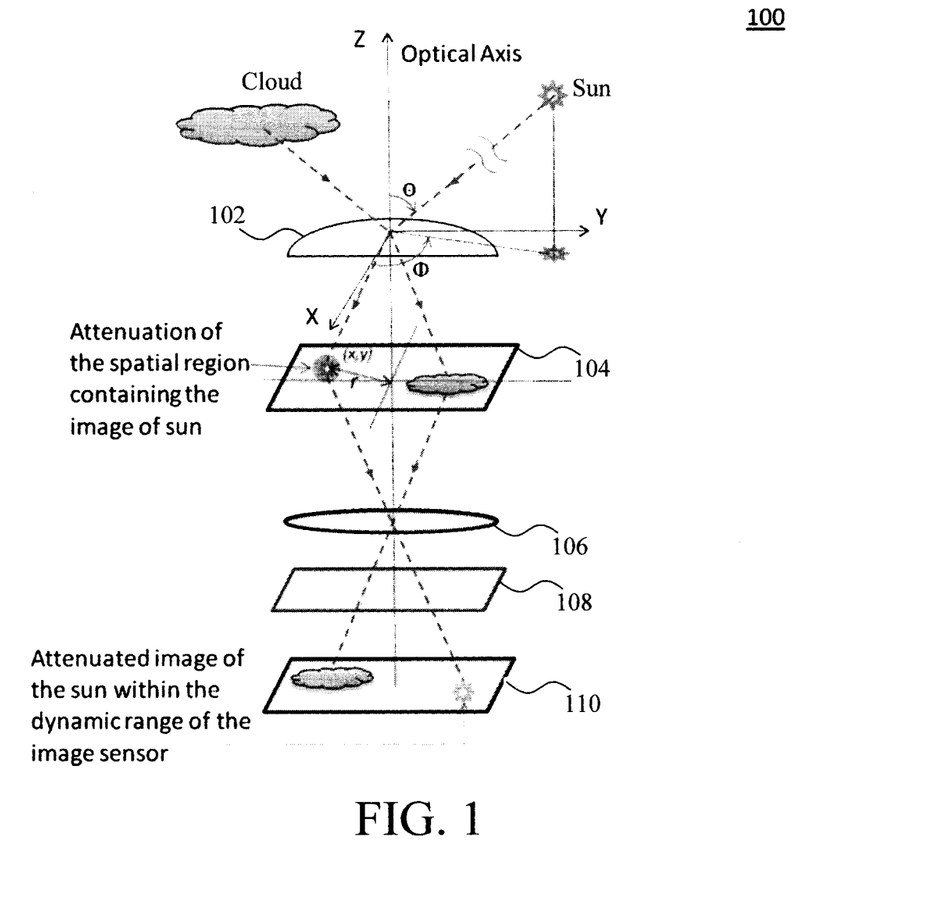
FIG. 1 is a diagram illustrating an exemplary sky camera system for total sky imaging and spectrally resolved irradiance/radiance measurement according to an embodiment of the present invention.

Sky Camera Design:

FIG. 1 is a diagram illustrating an exemplary sky camera system 100 according to the present techniques. Sky camera system 100 uses an objective lens (e.g., fish eye lens 102) which has a field-of-view (FOV) greater than about 170° for total sky coverage (when the sky camera system 100 is pointed upright/skyward). The lens may or may not have a built-in adjustable aperture (i.e., opening through which light travels). The adjustable aperture would serve to control the light intensity reaching the image sensor (thus the brightness of the images) and the focal depth of the camera system.

A fisheye lens causes unavoidable image distortion close to the edge of its FOV. For applications requiring imaging a large sky area, such as solar-forecasting for solar farms distributed over a large area, clear imaging of the sky closer to the horizon (far away from the sky camera) with lower image distortion may be desirable. For such applications the camera system may alternatively use a wide angle lens and the camera system may be mounted tilted on a rotational stage. In this case, the camera captures consecutive images while rotating along the axis perpendicular to earth surface for full sky coverage. This alternative embodiment is shown illustrated in FIG. 5, described below. As is known in the art, a wide angle lens has a focal length that is smaller than that of a standard lens for a given film plane thus having a wider field-of-view than standard lens.

At the image plane of the objective lens is a spatial light modulator 104, i.e., a device capable of programmable control of light absorption on its different pixels (spatial locations). In general, the spatial light modulator 104 serves to attenuate the light from bright objects (e.g., the sun) in the images captured by the objective lens to permit a complete image of the sky to be obtained (as opposed to using sun blockers which as provided above prevent important image data from being obtained).

Suitable spatial light modulators include, but are not limited to, liquid crystal modulators (those used in liquid crystal display (LCD) and LCD projectors), quantum well modulators, and micro-blinds based modulators. Liquid crystal modulators are described, for example, in C. Falldorf et al., "Liquid Crystal Spatial Light Modulators in Optical Metrology," 2010 $9^{th}$ Euro-American Workshop on Information Optics (WIO), pgs. 1-3, July 2010, the contents of which are incorporated by reference herein. Quantum well modulators are described, for example, in J. Piprek et al., "Analysis of Multi-Quantum Well Electroabsorption Modulators," SPIE Proceedings 4646-77, Physics and Simulation of Optoelectronic Devices X, Photonics West January, 2002, the contents of which are incorporated by reference herein. Micro-blinds based modulators are described, for example, in U.S. Pat. No. 7,684,105 issued to Lamontagne et al., entitled "Microblinds and a Method of Fabrication Thereof;" the contents of which are incorporated by reference herein.

The spatial light modulator allows, for instance, the high-intensity image of the sun attenuation to be comparable to the rest of the sky so that both can be fit into the dynamic range of the image sensor 110 (see below). The light absorbed by (or transmitted through) pixels of liquid crystal modulators are controlled by, e.g., an electrical field applied to the pixels, which controls the phase and light absorption of the liquid crystal material in the pixel. Quantum well-based spatial light modulators exploit the electroabsorption properties of, e.g., multiple quantum wells, i.e., the electron and hole wavefunctions in the quantum wells are modified by electrical field applied (to pixels of the modulator) which changes the light absorption in the quantum wells in the pixel(s). Micro-blinds-based modulators control light absorption in pixels via electrically switching micrometer-sized blinds between fully open and fully closed positions. The degree of light attenuation on the spatial light modulator can be controlled dynamically via feedback from the image-sensor 110, i.e., where the pixels of the image-sensor are saturated (too much incident light), light attenuation is increased at the corresponding pixels on the spatial light modulator—see FIG. 1 where the spatial region containing the image of the sun is attenuated. Where pixels of the image-sensor have low signal level, attenuation is decreased at the corresponding pixels on the spatial light modulator. Techniques for controlling light attenuation using a spatial light modulator are described, for example, in U.S. Pat. No. 5,917,568 issued to Johnson et al., entitled Adaptive Attenuating Spatial Light Modulator," the contents of which are incorporated by reference herein.

The image formed on the spatial light modulator 104 (the back image plane of the fisheye lens 102) is then projected to the image sensor 110 via one of more relay lenses 106. Relay lenses may be used singularly (or as a group of lenses) and serve to invert an image and to extend the optical tube. Relay lenses are commonly used in devices such as microscopes and endoscopes. Relay lenses are commercially available, for example, from Edmund Optics, Inc., Barrington, N.J.

Moreover, to collect spectral (wavelength dependent) information, a mechanically switched or electronically tunable spectral filtering component 108 is optionally placed between the objective lens and the image sensor, between the objective lens and the spatial light modulator, between the spatial light modulator and the relay lens, or between the relay lens and the image sensor. In embodiments including spectral filtering, the spectral filter component 108 may include, but is not limited to, mechanically switched filter wheels, electrochromatic glass, liquid crystal, or acousto-optical grating for switching between the desired wavelength windows in the UV-Vis-IR wavelength regime. Electrochromatic glass, or electronically switchable glass, permits users to regulate the amount of light that passes through the glass by (electronically) changing the opacity of the glass by applying a regulated charge to the glass. Electrochromatic glass is commercially available, for example, from SAGE Electrochromics, Farribault, Minn. Acousto-optical grated filters are described, for example, in U.S. Pat. No. 5,946,128 issued to Paek, entitled "Grating Assisted Acousto-Optic Tunable Filter and Method," the contents of which are incorporated by reference herein.

Finally, a semiconductor image sensor(s) 110 is used for imaging. Suitable semiconductor image sensors include, but are not limited to, charge-coupled device (CCD) and complementary metal-oxide semiconductor (CMOS) sensors (including those with anti-blooming features). CCD image sensors are described, for example, in U.S. Pat. No. 8,164,669 issued to Compton et al., entitled "Charge-Coupled Device Image Sensor with Efficient Binning of Same-Color Pixels," the contents of which are incorporated by reference herein. CMOS image sensors are described, for example, in U.S. Patent Application Publication Number 2013/0020662 filed by Kao et al., entitled "Novel CMOS Image Sensor Structure," the contents of which are incorporated by reference herein. In a CCD image sensor, pixels capture light and convert it to a digital signal at the edge of the chip. In a CMOS image sensor, the light is converted to a digital signal at the pixel itself.

A special type of CCD image sensor called an anti-blooming CCD is particularly suitable for such sky imaging purpose. An anti-blooming sensor (CCD or CMOS) incorporates into its pixels "drain channels" for overflown electrons. Consequently the threshold of incoming photon flux (light power density) to inducing blooming can be 1,000 times greater than a typical CCD or CMOS sensor. The usage of such an anti-blooming sensor would thus enable the total sky area to be imaged without the pixels for the image area around the sun being saturated due to electrons overflowing from the neighboring pixel where direct sun light hits.

Additional spectral coverage for IR light greater than 1,100 nm may be provided with III-V or II-VI semiconductor based IR image sensors. This includes indium gallium arsenide (InGaAs) array image sensors covering from about 600 nm to about 1,700 nm, indium antimonide (InSb) array image sensors covering from about 1.5 micrometers (μm) to about 5 μm, and mercury cadmium telluride (MCT) array image sensors covering from about 5 μm to about 10 μm.

Multiple image sensors can be combined to increase the spectral coverage in which case dichromatic beam-splitters (not shown) may be used to direct light in different wavelength regime to different image sensors. A dichromatic beam-splitter is a filter placed, for example, at 45 degrees with respect to the incident light beam and reflects light in a particular wavelength interval(s) and transmits light in other wavelength interval(s). The dichromatic beam-splitter may be inserted in the camera system before or after the relay lens. When inserted before the relay lens, multiple relay lenses are used for coupling the image plane of the objective lens to the corresponding image sensors. See for example FIG. 8, described below.

The overall dimensions of the sky camera system are determined by the choice of the objective (e.g., fisheye) lens and the relay lens. The spatial light modulator is placed at the back focal plane of the lens (i.e., the side of the lens opposite the sky which is being imaged). The back focal plane of the lens is where parallel beams entering a lens converge, typically on the order of several to tens of millimeters away from the rear surface of a fisheye lens. The spatial light modulator and the image sensors are placed at conjugate planes (typically tens to hundreds of millimeters from each other) which the relay lens(es) is/are designed to conjugate (relay). In one exemplary embodiment, relay lenses are omitted and the spatial light modulator is placed directly on top of the image sensor with the two in physical contact or the distance between the two no more than the pixel size of the spatial light modulator and the image sensor.

The entire sky camera system 100 is placed in a housing for field operation (i.e., to prevent the sky camera system from being affected by dust or rain) and is controlled by appropriate software to carry out the functionality of sky imaging and irradiance/radiance measurement under different light conditions. According to an exemplary embodiment, the sky camera system 100 is controlled by a computer-based apparatus 700, such as that shown in FIG. 7 and described below, to which the sky camera system 100 is remotely connected via a wired or wireless connection. Apparatus 700 can also serve to collect and process the data obtained from sky camera system 100.

Prior to field operation, the response (including spectral dependent response) of the camera system, i.e., of the semiconductor image sensor, (signal vs. light radiance) is calibrated indoors using an appropriate calibration light source of know radiation intensity such as a calibration lamp on an integration sphere. Calibration can be achieved by imaging the calibration source. The response of the camera system while the spatial light modulator is set to transparent is the output signal at the pixels of the image sensor(s) divided by the known radiation intensity of the calibration source. For a description of calibration using an integration sphere see, for example, P. D. Hiscocks, "Integrating Sphere for Luminance Calibration," published March 2012, the contents of which are incorporated by reference herein. Other applicable calibration light sources include solar simulator or outdoor solar radiation on a clear day.

For field operation a single such sky camera system 100 may carry out the functionality of various conventional instruments as illustrated below. For imaging the sky or cloud tracking, the pixels on the spatial light modulator occupied by the sun image are attenuated by a factor of from about $10^3$ to about $10^4$, while the rest of the pixels in the spatial light modulator remain transparent. The signal read-out from each pixel of the image sensor is then multiplied digitally by the factor of attenuation on the spatial light modulator to obtain the true sky image. The sky image can also be obtained in the desired spectral regions by appropriately setting the color filtering elements (the spectral filter component 108).

The direct solar irradiance can be quantified with sky camera system 100 by integrating the signal from the pixels of the sun image multiplied by the attenuation factor at the corresponding pixels of the spatial light modulator and the response of the camera system calibrated as described above. The integration of information received from pixels is described, for example, in U.S. Pat. No. 7,139,025 issued to Berezin, entitled "Active Pixel Sensor with Mixed Analog and Digital Signal Integration," the contents of which are incorporated by reference herein. Pyrheliometers are typically used to measure direct solar irradiance. Thus, sky camera system 100 functions to make pyrheliometer-type measurements. The diffusive solar irradiance can be quantified with sky camera system 100 by integrating the signal from all pixels on the sky image excluding the sun multiplied by the attenuation factor at the corresponding pixels of the spatial light modulator and the response of the sky camera system. With sky camera system 100, the total solar irradiance (i.e., direct and diffusive) is given simply by integrating the signal from all pixels on the sky image multiplied by the attenuation factor at the corresponding pixels of the spatial light modulator and the response of the camera system. Pyronameters with and without mechanical sun blockers are used to measure diffusive solar irradiance and total solar irradiance. Thus, sky camera system 100 functions to make pyranometer-based measurements. The spectrally-resolved solar total irradiance can be quantified with sky camera system 100 by integrating the signal from all pixels on the entire sky image multiplied by the attenuation factor at the corresponding pixels of the spatial light modulator and the response of the sky camera system when the color filtering element (spectral filter component 108) is set to appropriate spectral intervals. Spectroradiometers are typically used to measure spectrally-resolved solar total irradiance. Thus, sky camera system 100 also functions to make spectroradiometer-based measurements.

Figure 2:
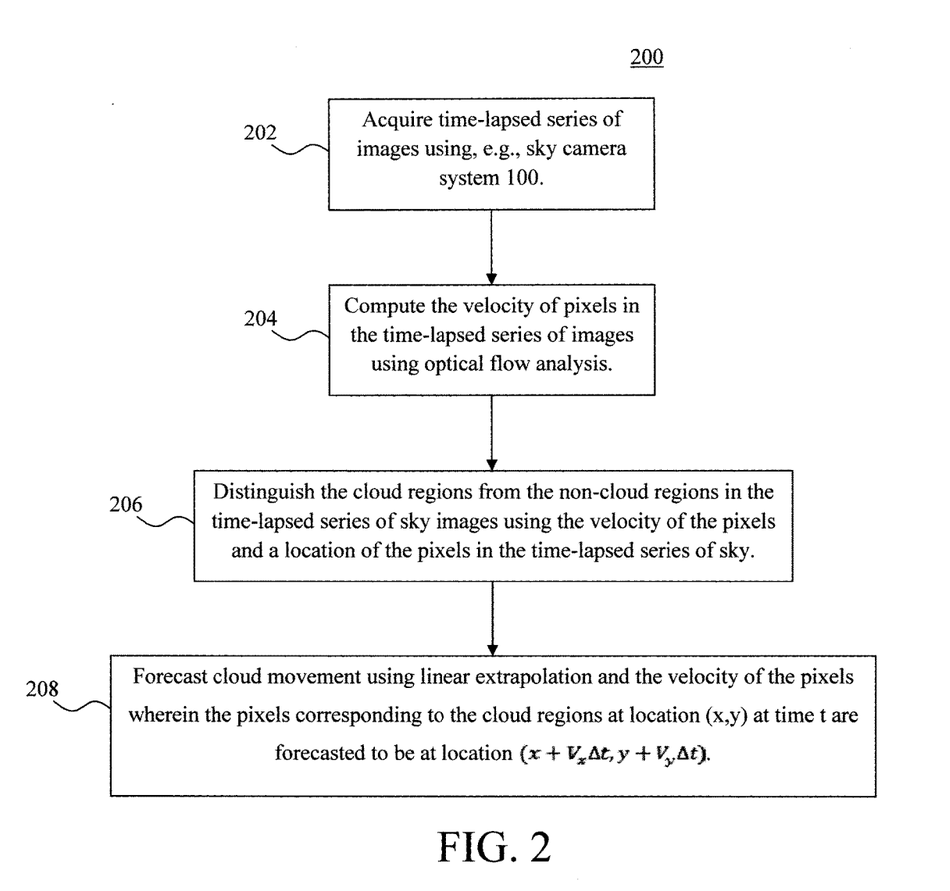
FIG. 2 is a diagram illustrating an exemplary methodology for use of sky camera system of FIG. 1 for optical flow based cloud tracking according to an embodiment of the present invention.

Optical Flow Based Cloud Tracking:

An exemplary methodology 200 for use of sky camera system 100 for optical flow based cloud tracking is now provided by way of reference to FIG. 2. The total sky images obtained with the sky camera system 100 can be used for cloud recognition and motion prediction as per methodology 200. Such prediction of cloud motion together with the radiance, direct solar irradiance, diffusive solar irradiance and/or spectrally-resolved solar total irradiance measured in the aforementioned fashion also using the sky camera system 100 are the key inputs for short term (less than 1 hour) solar power forecast. As known in the art, radiance refers to the radiation power incident on a unit area from a particular direction. The unit for radiance is watts per square centimeter steradian ($W/cm^2 sr$). Irradiance refers to radiation power that passes though a unit area from all directions in the hemisphere above the area. The unit for irradiance is watts per square centimeter ($W/cm^2$).

Clouds may be identified in images via a threshold method based on the following principle. Light coming from a clear sky region without clouds is dominated by Rayleigh scattering by gas molecules far smaller than the light wavelength. Blue (shorter wavelength) solar light has far stronger Rayleigh scattering than red (longer wavelength) solar light, thus the sky appears blue. Light scattered from a clouded region is dominated by Mie scattering by cloud particles comparable to or larger than the light wavelength, and as a result the scattered light appears white or grey. One can take a ratio of the blue pixel intensity to the red pixel intensity on the sky image and set a threshold. When the ratio is above the threshold (close to blue), one allocates the area to be no cloud, otherwise when the ratio is below the threshold (close to white or grey), one allocates the area to be clouded. Such cloud recognition, however, has its limitations wherever there is a presence of large aerosol (dust) concentration in polluted or desert area. The solar light scattering on aerosols (of size comparable to cloud particle) make the sky appear white/grey even without clouds. Thus the threshold method for cloud recognition becomes inaccurate.

Advantageously, provided herein is an alternative method of cloud recognition based on optical flow methods. Optical flow methods are used herein to compute the motion of objects in a time-lapsed series of images at every pixel location in the images. Thus, in step 202, a time-lapsed series of sky images are obtained using, for example, the sky imaging system 100 (of FIG. 1). As will be described in detail below, the sky imaging system 100 is particularly useful for cloud optical flow analysis since the present sky imaging system permits capturing complete sky images, including the sun. By comparison, conventional sky cameras use sun blockers which exclude image data from the region of the image containing the sun which would make optical flow analysis inaccurate for that (blocked) region.

Time-lapse photography is used to accentuate movement of objects which to the human eye would appear subtle, such as the movement of clouds across the sky. In general, time-lapse photography involves acquiring images at a frequency (also referred to as a frame rate—i.e., the frequency at which images are acquired) that is (significantly) less than the frequency human eyes are used to view the images. In this particular application, the sky camera system 100 may be used to capture a sky image once every from about 1 second to about 5 seconds. The frequency at which the images are obtained (to acquire the time-lapsed series of images) depends in part on the weather conditions, for example the amount of wind present and thus how fast the clouds are moving. For instance, if there is less wind and the clouds are moving (relatively) more slowly across the sky, then the sky camera system 100 may capture an image every 5 seconds. If on the other hand there is more wind and the clouds are moving (relatively) more quickly across the sky, then the frequency (frame rate) might be increased to, e.g., one image per second. One skilled in the art would be able to configure the frame rate to a given set of weather conditions.

Similarly, the number of images taken in the series can depend on the particular weather conditions. For instance, one goal of methodology 200 is to track cloud cover in order to forecast/predict when the sun might be occluded by cloud cover and when it will not. That way the amount of future solar radiation can be estimated. If the sky is clear and few if any clouds are present, then a greater number of images need to be acquired in order to gain useful data about the cloud movement relative to the sun's position. Conversely, if there are clouds in the immediate area of the sun, then a few images might yield enough information for analysis. In general however, for typical weather conditions, the time-lapsed series of images will include from about 2 images to about 50 images acquired, for example, using the sky camera system 100. Again, one skilled in the art would be able to determine the number of images needed for a given set of weather conditions to determine cloud movement.

It is notable that in order to have a constant frame of reference (for image location), it is preferable for the sky camera system 100 when taking the time-lapsed series of images to remain at a fixed location, especially when a single sky camera system is being used. However, as will be described in detail below, embodiments are provided herein where multiple sky camera systems are employed and used for three-dimensional cloud tracking.

Details of the optical flow analysis techniques used herein are now provided. In the simple case for time-lapsed two-dimensional images, a pixel of intensity I(x, y, t) at location (x, y) (i.e., a pixel location) and time t is assumed to move by $\Delta x$, $\Delta y$ at time t+$\Delta t$ and thus the following equation holds:

$$I(x,y,t)=I(x+\Delta x, y+\Delta y, t+\Delta t). \quad (1)$$

Assuming that the motion between an image and the immediate next image captured is small, applying a $1^{st}$ order Taylor expansion to I(x+$\Delta x$, y+$\Delta y$, t+$\Delta t$) yields, $$I(x+\Delta x, y+\Delta y, t+\Delta t) = I(x, y, t) + \frac{\partial I}{\partial x}\frac{\Delta x}{\Delta t} + \frac{\partial I}{\partial y}\frac{\Delta y}{\Delta t} + \frac{\partial I}{\partial t}. \quad (2)$$

Combining Equations (1) and (2) it follows that:

$$\frac{\partial I}{\partial x}V_x + \frac{\partial I}{\partial y}V_y + \frac{\partial I}{\partial t} = 0, \quad (3)$$

wherein $$V_x = \frac{\Delta x}{\Delta t} \text{ and } V_y = \frac{\Delta y}{\Delta t}$$

is the x and y velocity of the object at location (x, y). Equation (3) combined with further constraints allows $V_x$, $V_y$ to be solved. By way of example only, the Lucas-Kanade implement of optical flow, further constraints are introduced by assuming ($V_x$, $V_y$) are constant in local pixel neighborhood. See, for example, B. D Lucas and T. Kanade, "An Iterative Image Registration Technique with an Application to Stereo Vision," Proceedings of Imaging Understanding Workshop, pp. 121-130 (April 1981), the entire contents of which are incorporated by reference herein. Another implementation by Horn and Schunck introduces global smoothness of the velocity field ($V_x$, $V_y$) as the further constraint. See, for example, B. K. P Horn et al., "Determining Optical Flow," Artificial Intelligence, 17, 185-203 (August 1981), the entire contents of which are incorporated by reference herein. Other applicable constraints are contained in a comprehensive review of optical flow methods provided by J. L. Barron et al., "Performance of Optical Flow Techniques," International Journal of Computer Vision, volume 12, page 43-77 (February 1994), the entire contents of which are incorporated by reference herein can be used to solve the velocity field ($V_x$, $V_y$) for every location on the image.

Thus, in step 204, optical flow analysis (see Equations 1-3 above) is used to compute the velocity of pixels in the time-lapsed series of images (from step 202). The pixels corresponding to a cloud (and thus having a certain intensity I) will have a certain finite velocity in the time-lapsed series of images since the clouds are moving. On the other hand, the pixels corresponding to the non-cloud sky regions (e.g., regions of blue sky) (and thus having a different intensity) will have a zero velocity in the time-lapsed series of images since those regions of non-cloud sky are not moving. By zero velocity we refer to no velocity or any small velocity value within the uncertainty caused by the noise in the images. Such uncertainty can be quantified through analyzing a series of sample images of clear sky (visually identified to be cloud free) using the optical flow method.

Thus, the derived velocity field of the sky images can serve two purposes. First, as per step 206, it allows the discrimination of the cloud vs. non-cloud sky region. Namely, as highlighted above, a piece of cloud will have the same finite velocity (due to wind) of motion while the non-cloud region have a zero velocity. Thus, the pixels corresponding to cloud regions will have a positive, finite velocity computed in step 204, while those pixels corresponding to the non-cloud regions will have a zero velocity. From the pixel locations, the cloud and non-cloud regions in the images can be distinguished. The position of a cloud can be obtained, for example, by finding the center of mass of a group of consecutive pixels of similar finite velocity. The boundary of a cloud can be obtained, for example, by finding the boundary between a group of consecutive pixels of similar finite velocity and surrounding pixels. Second, as per step 208, the velocity field enables short range (less than one hour) forecasting via assuming constant cloud velocity and linear extrapolation, i.e., for a cloud at location (x,y) at time t will be forecasted to be at location $(x+V_x \Delta t, y+V_y \Delta t)$. Thus, given a location of a pixel in the time-lapsed series of sky images (corresponding to a cloud) and the calculated velocity of the pixel, linear extrapolation can be used to predict where the pixel/cloud will be at a future point in time.

Unlike the conventional threshold based methodology, the optical flow based process for cloud recognition and forecast provided herein will work in spite of a hazy aerosol sky background. As highlighted above, the design of the sky camera system 100 enables cloud close to the sun region to be recognized and forecasted, which is an advantage over a conventional system based on mechanical blocking.

Multiple Cameras for Three-Dimensional Cloud Tracking:

When a single sky camera is available, the two-dimensional cloud information can be extracted using the aforementioned optical flow process. Three-dimensional cloud analysis (including cloud height) can be derived via deploying at least two cameras and triangulation using solar, i.e., the sun's position as a convenient reference point as detailed below.

Figure 3:
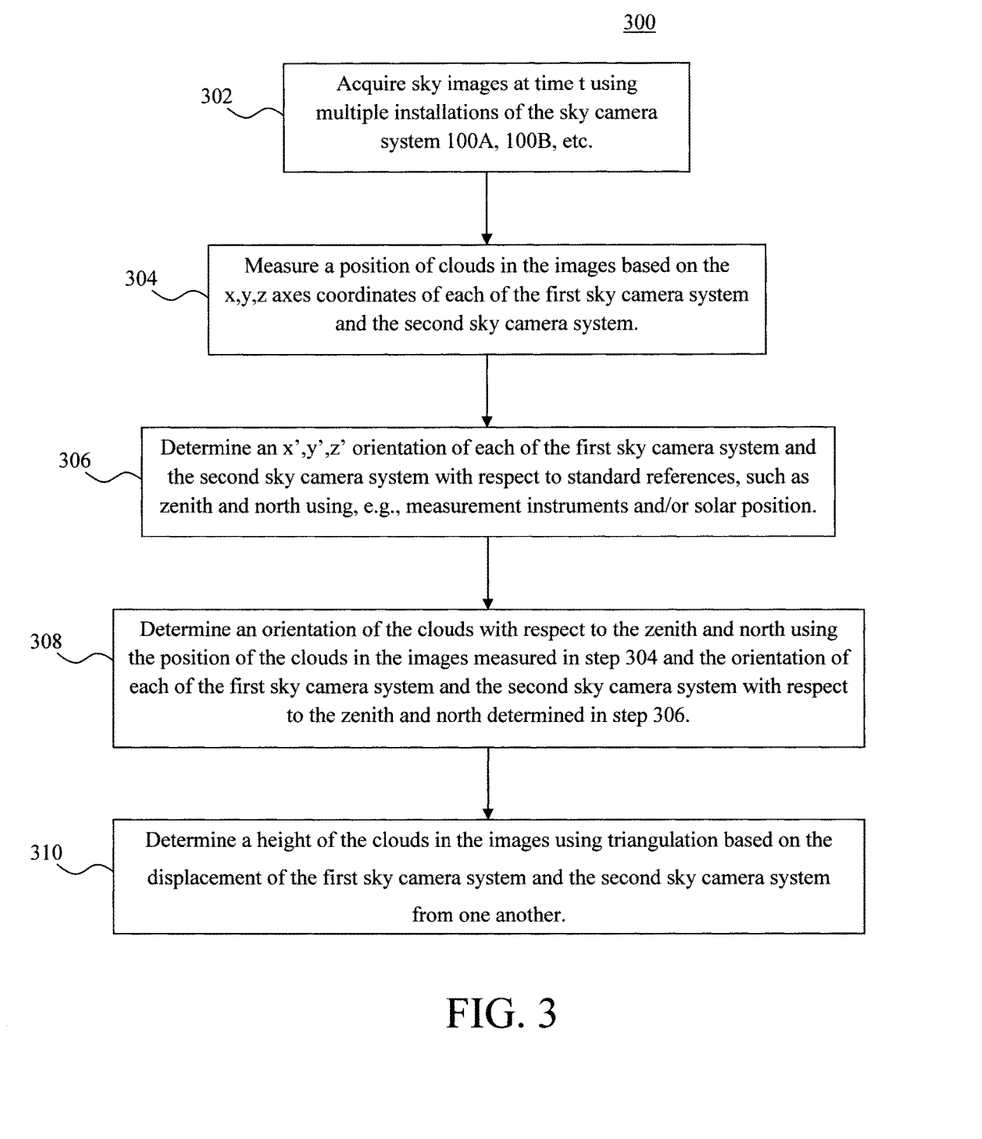
FIG. 3 is a diagram illustrating an exemplary methodology for three-dimensional cloud analysis according to an embodiment of the present invention.

FIG. 3 is a diagram illustrating an exemplary methodology 300 for three-dimensional cloud analysis. In step 302, sky images are acquired at time t using multiple installations of the sky camera systems 100. According to an exemplary embodiment, at least two different sky camera systems 100 are employed at different locations, the installations referred to herein arbitrarily as sky camera system 100A and sky camera system 100B. By way of example only, sky camera system 100A and sky camera system 100B are located (e.g., based on three-dimensional GPS coordinates—see below) at a distance of from about 100 meters to about 1,000 meters, and ranges therebetween from one another. The distance specified here refers to inter-camera distance in three-dimensional space. When possible, a large distance is preferred to improve triangulation accuracy (see below). A schematic diagram illustrating multiple sky camera systems 100A, 100B, etc. is provided in FIG. 4, described below. It is notable that the three-dimensional coordinates obtained, e.g., using GPS, for the sky camera systems can be used to determine the displacement from one sky camera system to the other. The displacement is the vector from the first sky camera system to the other. Thus, if sky camera system 100A is at (x1, y1, z1) and sky camera system 100B is at (x2, y2, z2), then the displacement is the vector (x2−x1, y2−y1, z2−z1).

For any given fisheye lens, the relationship between the angle of an object with respect to the optical axis of the lens Θ and the projected distance between the image of the object and the optical axis r on the image plane is known and called the mapping function of the fisheye lens r=f(Θ). In step 304, the mapping function allows the azimuth and zenith angles (Φ, Θ) of any object (such as the sun or a cloud, see FIG. 1) with respect to the camera system to be measured from the position of the image of the object on the image plane of the lens (x,y). Thus, in step 304, the solar or cloud position (Φ, Θ) is measured from the images (acquired in step 302) based on the x,y,z axes coordinates of each sky camera system 100A and 100B (see FIG. 1).

Figure 9:
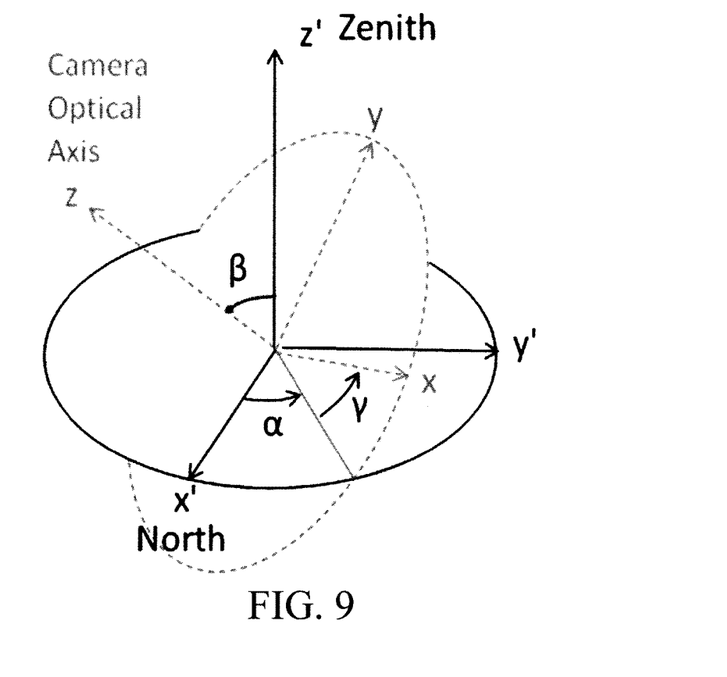
FIG. 9 is a diagram illustrating use of three Euler angles ($\alpha$, $\beta$, $\gamma$) to denote the orientation of the sky camera system with respect to a reference coordinates (zenith and north) according to an embodiment of the present invention.

To enable triangulation of three-dimensional cloud positions, one must also know the orientation of each of the sky camera systems with respect to a standard reference (for example defined by the zenith, opposite to the direction of gravity and north). See step 306 of methodology 300. The orientation of a rigid body such as a camera with respect to reference coordinates (such as zenith and north) can be represented by the notation of three Euler angles (α, β, γ) as illustrated in FIG. 9 in which xyz represent the axes of the sky camera system (refer to FIG. 1), x' y' z' reference the fixed reference coordinates defined by zenith (z') and north (x'). The orientation of the sky camera systems can be determined in a couple of different ways.

In one exemplary embodiment, the orientations of the sky camera systems with respect to zenith and north are measured using instrumentation such as a combination of accelerometer and/or electronic inclinometer and/or gyroscopes and/or magnetometer based electronic compasses as described, for example, U.S. Patent Application Publication Number 2010/0250177 A1, filed by Van Acht et al., entitled "Orientation Measurement of an Object," and U.S. Patent Application Publication Number 2012/0075109 A1, filed by Wang et al., entitled "Multi Sensor Position and Orientation System," the entire contents of each of which are incorporated by reference herein. In another exemplary embodiment, the orientations of the sky camera systems are measured with instruments and then corrected using solar position as a reference point. This alternative exemplary embodiment is described in conjunction with the description of FIG. 5, below.

Figure 4:
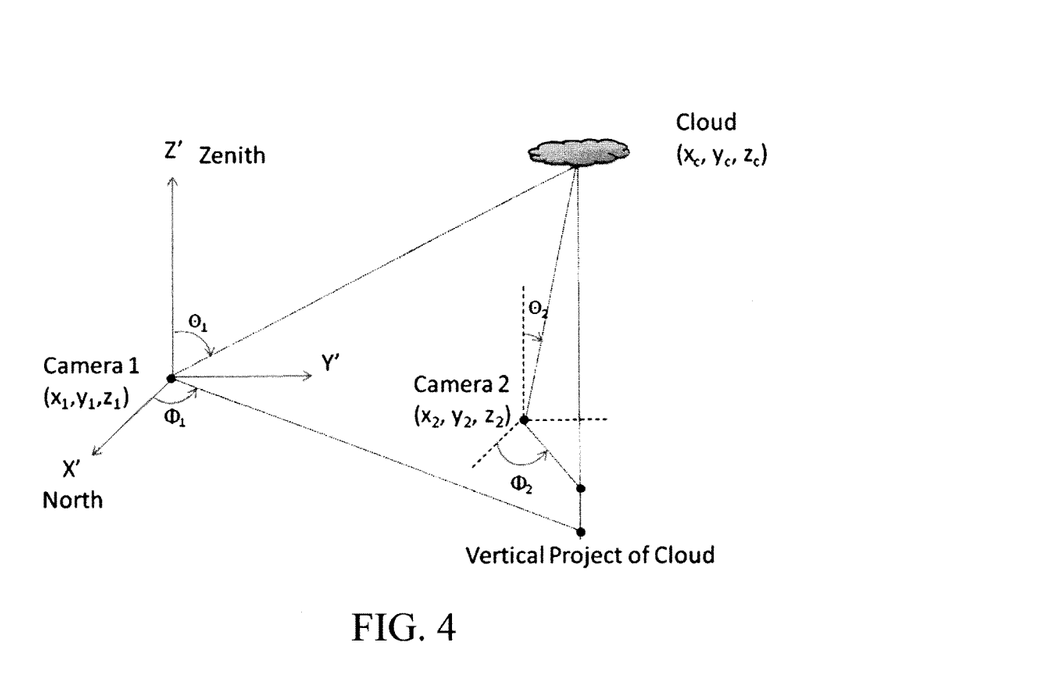
FIG. 4 is a diagram illustrating the geometry for determining cloud height triangulation using multiple sky camera installations according to an embodiment of the present invention.

Knowing the azimuth (Φ) and zenith (θ) angles of cloud or sun in the sky camera system coordinate xyz (as defined in FIG. 1) and the orientation of the sky camera system with respect to the reference coordinates x'y'z' defined by zenith and north (FIG. 9), the azimuth ($\Phi_1$) and zenith ($\theta_1$) angle of cloud or sun with respect to the x'y'z' can be calculated in step 308 using the following equation (refer to FIG. 4).

$$\begin{pmatrix} \sin\theta_1 \cos\Phi_1 \\ \sin\theta_1 \sin\Phi_1 \\ \cos\theta_1 \end{pmatrix} = \begin{pmatrix} \cos\alpha & \sin\alpha & 0 \\ -\sin\alpha & \cos\alpha & 0 \\ 0 & 0 & 1 \end{pmatrix}^{-1} \qquad (4)$$

$$\begin{pmatrix} 1 & 0 & 0 \\ 0 & \cos\beta & \sin\beta \\ 0 & -\sin\beta & \cos\beta \end{pmatrix}^{-1} \begin{pmatrix} \cos\gamma & \sin\gamma & 0 \\ -\sin\gamma & \cos\gamma & 0 \\ 0 & 0 & 1 \end{pmatrix}^{-1} \begin{pmatrix} \sin\theta\cos\Phi \\ \sin\theta\sin\Phi \\ \cos\theta \end{pmatrix}$$

To enable three-dimensional cloud analysis, as highlighted above, at least two sky camera systems 100A and 100B are deployed with a separation of from about 100 meters to about 1,000 meters and ranges therebetween from one another. Thus the orientations of clouds with respect to the zenith and north at the location of the first and second sky cameras $(\Theta_1, \Phi_1)$ and $(\Theta_2, \Phi_2)$ as illustrated in FIG. 4 are determined using the aforementioned methods.

Finally in step 310 $(\Theta_1, \Phi_1)$ and $(\Theta_2, \Phi_2)$ and the displacement between the two sky camera systems (see above) can be used to derive the vertical height of the clouds via triangulation. See FIG. 4, and using equation (5) below. The term "displacement," as used herein refers to a three-dimensional relation between the two camera systems, i.e., based on the three-dimensional coordinates of the sky camera systems obtained using, e.g., GPS (see above). In Equation (5) $(x_1, y_1, z_1)$ and $(x_2, y_2, z_2)$ are the spatial coordinates of the first and second sky camera and $(x_c, y_c, z_c)$ are the calculated coordinates of the cloud. Thus, in step 310, a vertical height of the clouds in the images can be determined using triangulation based on the distance the sky camera systems 100A, 100B are from one another.

$$\begin{cases} x_c = x_1 + \cos\Phi_1 \dfrac{(x_2 - x_1)\sin\Phi_2 - (y_2 - y_1)\cos\Phi_2}{\cos\Phi_1 \sin\Phi_2 - \sin\Phi_1 \cos\Phi_2} \\ y_c = y_1 + \sin\Phi_1 \dfrac{(x_2 - x_1)\sin\Phi_2 - (y_2 - y_1)\cos\Phi_2}{\cos\Phi_1 \sin\Phi_2 - \sin\Phi_1 \cos\Phi_2} \\ z_c = z_1 + \cot\theta_1 \dfrac{(x_2 - x_1)\sin\Phi_2 - (y_2 - y_1)\cos\Phi_2}{\cos\Phi_1 \sin\Phi_2 - \sin\Phi_1 \cos\Phi_2} \end{cases} \quad (5)$$

FIG. 4 is a diagram illustrating the geometry for determining cloud height triangulation achievable using multiple sky camera installations. In FIG. 4, sky camera system 100A and sky camera system 100B are labeled "Camera 1" and "Camera 2," respectively. The zenith with respect to each of the sky camera systems is labeled, as is north.

To the extent that the accuracy of the sky camera system orientation measurement directly affects the triangular accuracy for cloud lateral position and height measurement, it may be desirable to use the position of the sun as an independent calibration of the orientation. See methodology 500 of FIG. 5. In this exemplary embodiment, the solar position (position of the sun) serves as a reference point for correcting the measured orientation of the sky camera systems.

Figure 5:
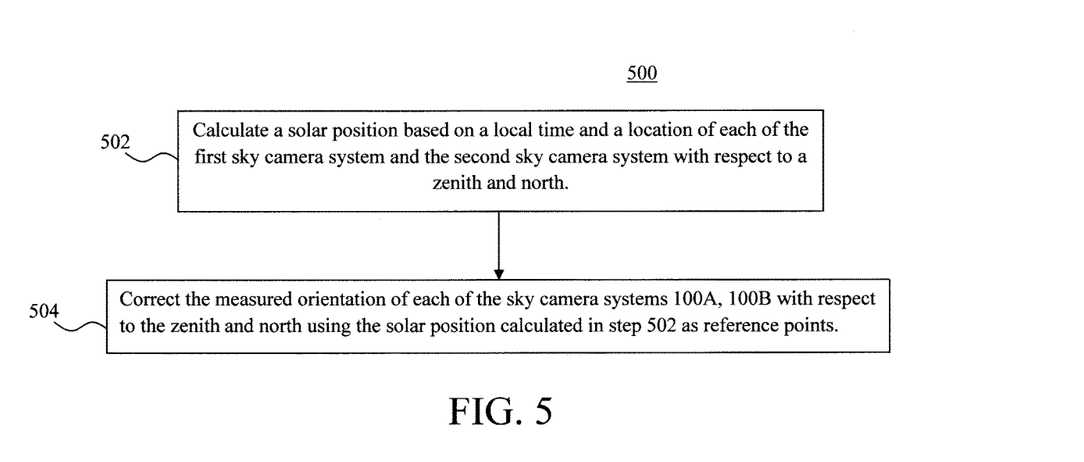
FIG. 5 is a diagram illustrating an exemplary methodology for using solar position (position of the sun) as a reference point for correcting the measured orientation of the sky camera systems according to an embodiment of the present invention.

The accurate solar position (i.e., position of the sun) at any given sky camera location (latitude, location, and elevation)—obtained using any GPS device) and local time can be calculated. The solar position is defined using zenith angle (with respect to the zenith, defined as direct opposite to the gravitational force at that location and azimuth angle (with respect to north). For such calculations one may apply the process provided by Reda, I., Andreas, A., (2003) "Solar Position Algorithm for Solar Radiation Applications, National Renewable Energy Laboratory (NREL) Technical report NREL/TP-560-34302, Revised January 2008, the entire contents of which are incorporated by reference herein. Thus in step 502, the solar position is calculated based on the location (e.g., latitude, location, and elevation) of each of the sky camera systems 100A, 100B with respect to the true zenith and true north.

The calculated solar zenith and azimuth angle, $(\Phi_1, \theta_1)$, with respect to the zenith and north vs. the measured zenith and azimuth angle, $(\Phi, \theta)$, with respect to the orientation of the sky camera—see step 304 of FIG. 3, described above thus enables correction of measurement error of the orientation of the sky camera represented by, for instance, the three Euler angles $(\alpha, \beta, \gamma)$ shown in FIG. 9. This can be done again using Equation (4), above. As an example, knowing $(\Phi_1, \theta_1)$ and $(\Phi, \theta)$, Equation (4) provides two sets of constraints for $(\alpha, \beta, \gamma)$ so that with the knowledge of one angle out of the three, the other two angles can be solved. The tilt angle of the camera optical axis $(\beta)$ can be accurately measured via an inclinometer (with error as small as 0.01 degrees) and used to solve accurately $\alpha$ and $\gamma$. This can serve as a correction for the direct measurement of $\alpha$ and $\gamma$ using for example magnetometer based electronic compasses which are far less accurate. Such correction of the orientation of the sky camera system is done when land-based (fixed) sky camera systems are first installed. For mobile sky camera systems (say ship-borne systems) the calculation is done continuously to update the sky camera orientation when the sun is available. This feature is particularly important for mobile sky-camera systems as the orientation of the camera can be continuously changing with ship pitching and rolling. Thus, in step 504, the measured orientation of each of the sky camera systems 100A, 100B with respect to the zenith and north is corrected using the solar position calculated in step 502 as reference points.

Figure 6:
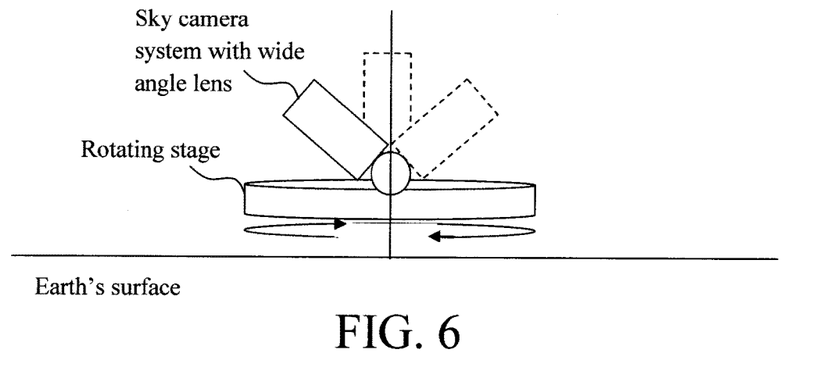
FIG. 6 is a diagram illustrating an alternate embodiment of the present sky camera system having a wide angle lens according to an embodiment of the present invention.

As provided above, in an alternate embodiment the present sky camera system may use a wide angle lens and the sky camera system may be mounted tilted on a rotational stage. Such an exemplary embodiment is shown illustrated in FIG. 6. As shown in FIG. 6, the sky camera system can be used to capture consecutive images while the rotating stage turns the sky imaging system along the axis perpendicular to the earth's surface. Accordingly, full sky coverage can be achieved in a manner similar to a fish eye lens.

Figure 7:
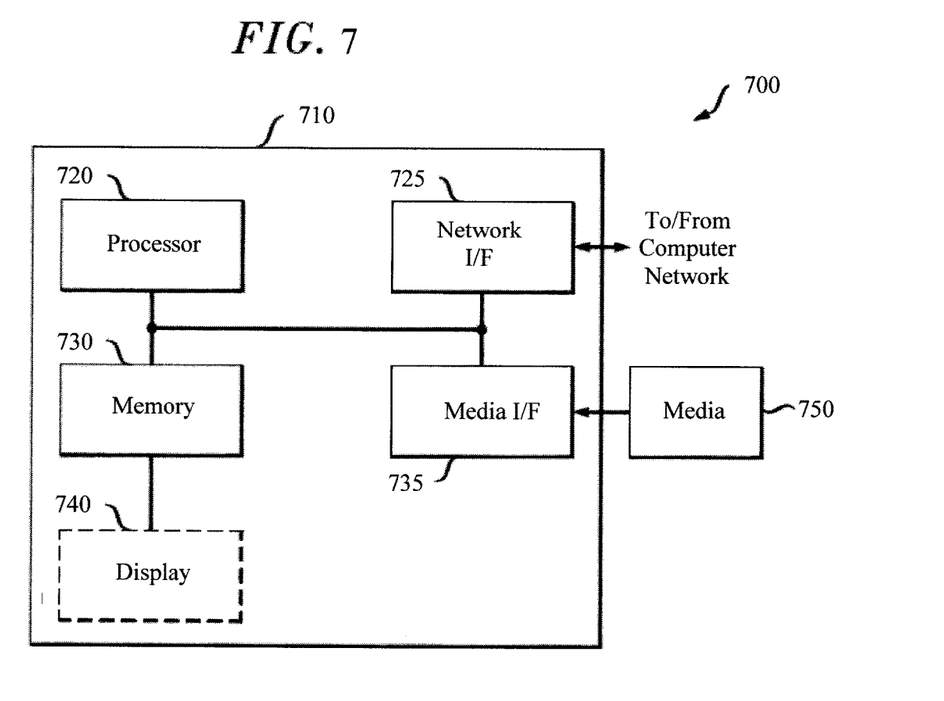
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 200 of FIG. 2 for optical flow based cloud tracking and/or one or more of the steps of methodology 300 of FIG. 3 for three-dimensional cloud analysis. For instance, as provided above, a computer-based apparatus (such as apparatus 700) may be configured to control and/or receive data from the present sky camera system(s) and to analyze the data.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

As is known in the art, the methods and apparatus discussed herein may be distributed as an article of manufacture that itself comprises a machine-readable medium containing one or more programs which when executed implement embodiments of the present invention. For instance, when apparatus 700 is configured to implement one or more of the steps of methodology 200 the machine-readable medium may contain a program configured to (a) obtain a time-lapsed series of sky images using a sky camera system including (i) an objective lens having a field of view of greater than about 170 degrees, (ii) a spatial light modulator at an image plane of the objective lens, wherein the spatial light modulator is configured to attenuate light from objects in images captured by the objective lens, (iii) a semiconductor image sensor, and (iv) one or more relay lens configured to project the images from the spatial light modulator to the semiconductor image sensor, and (b) compute a velocity of one or more pixels in the time-lapsed series of sky images using optical flow analysis, wherein pixels in the time-lapsed series of sky images corresponding to cloud regions have a finite velocity and pixels in the time-lapsed series of sky images corresponding to non-cloud regions have a zero velocity.

When apparatus 700 is configured to implement one or more of the steps of methodology 300 the machine-readable medium may contain a program configured to (a) obtain sky images from each of at least one first sky camera system and at least one second sky camera system, wherein the first sky camera system and the second sky camera system each includes (i) an objective lens having a field of view of greater than about 170 degrees, (ii) a spatial light modulator at an image plane of the objective lens, wherein the spatial light modulator is configured to attenuate light from objects in an image captured by the objective lens, (iii) a semiconductor image sensor, and (iv) one or more relay lens configured to project the image from the spatial light modulator to the semiconductor image sensor, and wherein the first sky camera system and the second sky camera system are located at a distance of from about 100 meters to about 1,000 meters from one another; (b) measure a position of clouds in the images based on x,y,z axes coordinates of each of the first sky camera system and the second sky camera system; (c) determine an x',y',z' orientation of each of the first sky camera system and the second sky camera system with respect to zenith and north as references; (d) determine an orientation of the clouds with respect to the zenith and north using the position of the clouds in the images measured in step (b) and the orientation of each of the first sky camera system and the second sky camera system with respect to the zenith and north determined in step (c); and (e) calculate a position and a vertical height of the clouds in the sky using triangulation based on the orientation of the clouds with respect to the zenith and north from step (d) and three-dimensional coordinates of the first sky camera system and the second sky camera system. The machine-readable medium may be a recordable medium (e.g., floppy disks, hard drive, optical disks such as removable media 750, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Figure 8:
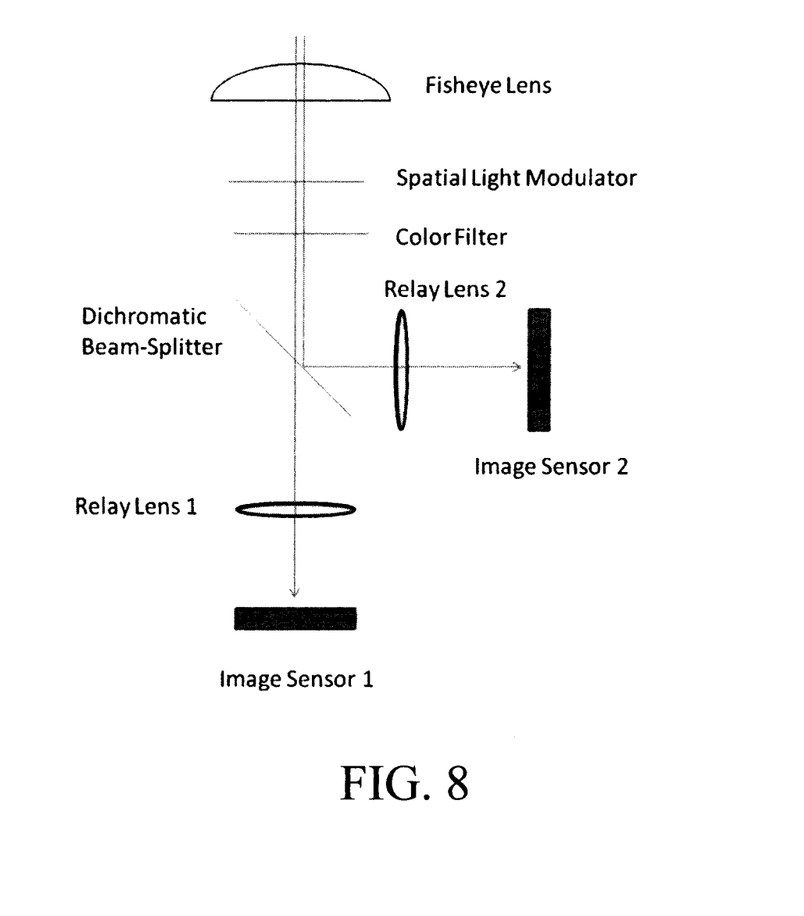
FIG. 8 is a schematic diagram illustrating integration of a dichromatic beam splitter in the present sky camera system according to an embodiment of the present invention.

As described above, multiple image sensors may be employed in the present sky camera system(s). To do so, a beam splitter may be needed. FIG. 8 is a schematic diagram illustrating how a dichromatic beam splitter may be integrated into the present sky camera system. The multiple image sensors are labeled Image Sensor 1 and Image Sensor 2. In this example, the dichromatic beam-splitter is inserted in the sky camera system before the relay lens. Thus, as highlighted above, multiple relay lenses (labeled Relay Lens 1 and Relay Lens 2) are used for coupling the image plane of the objective lens to the corresponding image sensors.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A sky camera system, comprising:
   an objective lens having a field of view of greater than or equal to 170 degrees;
   a spatial light modulator at an image plane of the objective lens, wherein the spatial light modulator is programmable and is configured to attenuate light from objects including direct sun in images captured by the objective lens such that the sky camera system is configured to obtain sky images including an image of the sun;
   at least one anti-blooming semiconductor image sensor behind the spatial light modulator; and
   one or more relay lenses, between the spatial light modulator and the anti-blooming semiconductor image sensor, configured to project the images from the spatial light modulator to the anti-blooming semiconductor image sensor, wherein the spatial light modulator is configured to attenuate the image of the sun such that the image of the sun can fit into a dynamic range of the anti-blooming semiconductor image sensor, and wherein a response of the sky camera system, prior to field operation, has been calibrated indoors using a calibration light source of known radiation intensity with the spatial light modulator set to transparent, and wherein the sky camera system is free of a mechanical sun blocker and thus can obtain a complete sky image.

2. The sky camera system of claim 1, wherein the objective lens comprises a fish eye lens.

3. The sky camera system of claim 1, wherein the spatial light modulator comprises a liquid crystal modulator, a quantum well modulator, or a micro-blinds based modulator.

4. The sky camera system of claim 1, wherein the anti-blooming semiconductor image sensor comprises a charge-coupled device (CCD) sensor.

5. The sky camera system of claim 1, wherein the anti-blooming semiconductor image sensor comprises a complementary metal-oxide semiconductor (CMOS) sensor.

6. The sky camera system of claim 1, further comprising:
   a spectral filtering component between the objective lens and the anti-blooming semiconductor image sensor configured to switch between desired wavelength windows, wherein the spectral filtering component comprises mechanically-switched filter wheels.

7. The sky camera system of claim 1, wherein the anti-blooming semiconductor image sensor comprises a sensor covering from about 400 nm to about 1,100 nm spectral region.

8. The sky camera system of claim 1, wherein the sky camera system comprises multiple anti-blooming semiconductor image sensors and multiple relay lenses, and wherein the sky camera system further comprises:

a dichromatic filtering component between the objective lens and the multiple anti-blooming semiconductor image sensors configured to capture images from multiple desired wavelength windows via the multiple relay lenses each of which couples the image plane of the objective lens to a corresponding one of the multiple anti-blooming semiconductor image sensors.

9. The sky camera system of claim 8, wherein the dichromatic filtering component comprises electrochromatic glass, liquid crystal, or acousto-optical grating.

10. A total sky imaging system, comprising:

at least one first sky camera system and at least one second sky camera system, wherein the first sky camera system and the second sky camera system each includes (i) an objective lens having a field of view of greater than or equal to 170 degrees, (ii) a spatial light modulator at an image plane of the objective lens, wherein the spatial light modulator is programmable and is configured to attenuate light from objects including direct sun in images captured by the objective lens such that the first sky camera system and the second sky camera system are each configured to obtain sky images including an image of the sun, (iii) at least one anti-blooming semiconductor image sensor behind the spatial light modulator, and (iv) one or more relay lenses, between the spatial light modulator and the anti-blooming semiconductor image sensor, configured to project the images from the spatial light modulator to the anti-blooming semiconductor image sensor, wherein the spatial light modulator is configured to attenuate the image of the sun such that the image of the sun can fit into a dynamic range of the anti-blooming semiconductor image sensor, and wherein a response of the first sky camera system and the second sky camera system, prior to field operation, has been calibrated indoors using a calibration light source of known radiation intensity with the spatial light modulator set to transparent, wherein the first sky camera system and the second sky camera system are each free of mechanical sun blockers and thus can obtain complete sky images, and wherein the first sky camera system and the second sky camera system are located at a distance of from about 100 meters to about 1,000 meters from one another.

11. The total sky imaging system of claim 10, wherein the first sky camera system and the second sky camera system each further includes (v) a spectral filtering component between the objective lens and the anti-blooming semiconductor image sensor configured to switch between desired wavelength windows.

12. The total sky imaging system of claim 10, wherein the objective lens comprises a fish eye lens.

13. The total sky imaging system of claim 10, wherein the spatial light modulator comprises a liquid crystal modulator, a quantum well modulator, or a micro-blinds based modulator.

14. The total sky imaging system of claim 10, wherein the anti-blooming semiconductor image sensor comprises a CCD sensor.

15. The total sky imaging system of claim 10, wherein the anti-blooming semiconductor image sensor comprises a CMOS sensor.

16. The total sky imaging system of claim 10, wherein the anti-blooming semiconductor image sensor comprises a sensor covering from about 400 nm to about 1,100 nm spectral region.

17. The total sky imaging system of claim 10, wherein the first sky camera system and the second sky camera system each comprises multiple anti-blooming semiconductor image sensors and multiple relay lenses, and wherein the first sky camera system and the second sky camera system each further comprises:

a dichromatic filtering component between the objective lens and the multiple anti-blooming semiconductor image sensors configured to capture images from multiple desired wavelength windows via the multiple relay lenses each of which couples the image plane of the objective lens to a corresponding one of the multiple anti-blooming semiconductor image sensors.

18. The total sky imaging system of claim 17, wherein the dichromatic filtering component comprises electrochromatic glass, liquid crystal, or acousto-optical grating.

19. The sky camera system of claim 1, wherein the calibration light source of know radiation intensity is a calibration lamp on an integration sphere.

* * * * *